United States Patent [19]

Ragle

[11] Patent Number: 4,885,800
[45] Date of Patent: Dec. 5, 1989

[54] TRANSMITTER ATTACHMENT FOR HUNTING ARROWS

[76] Inventor: Clyde M. Ragle, 9251 Spalding, Omaha, Nebr. 68134

[21] Appl. No.: 357,428

[22] Filed: May 25, 1989

[51] Int. Cl.⁴ .................. H04B 1/034; A63B 65/02
[52] U.S. Cl. ........................................ 455/98; 455/95; 455/127; 455/66; 273/416
[58] Field of Search ............. 455/98, 95, 66, 91, 455/127; 273/416, 423, 213; 342/386, 458

[56] References Cited

U.S. PATENT DOCUMENTS

| | | | |
|---|---|---|---|
| 3,790,948 | 2/1974 | Ratkovich | 455/98 X |
| 4,340,930 | 7/1982 | Carissimi | 273/416 X |
| 4,421,319 | 12/1983 | Murphy | 273/416 |
| 4,651,999 | 3/1987 | Sturm | 273/416 |
| 4,675,683 | 6/1987 | Robinson et al. | 342/386 |
| 4,704,612 | 11/1987 | Boy et al. | 342/386 |
| 4,749,198 | 6/1988 | Brailean | 455/98 X |
| 4,836,557 | 6/1989 | Polando | 273/416 |

Primary Examiner—Robert L. Griffin
Assistant Examiner—Ralph E. Smith
Attorney, Agent, or Firm—Zarley, McKee, Thomte, Voorhees & Sease

[57] ABSTRACT

A transmitter attachment for hunting arrows includes a hollow tubular member which is removably mounted between the arrowhead and shaft of a conventional hunting arrow. The tubular member has a transmitter mounted in one end, and a battery slidably mounted between a pair of spring contacts in the other end. The battery is mounted so as to slide forward into electrical contact with a coil spring, which closes an electrical circuit to energize the transmitter, when the arrow hits the target or the ground. Thus, the combination of battery and contacts forms a type of inertia switch. A directional receiver is utilized to locate the arrow. The transmitter is deactivated by tapping the nock-end of the arrow against the ground—which slides the battery out of contact with the coil spring.

5 Claims, 1 Drawing Sheet

U.S. Patent    Dec. 5, 1989    4,885,800
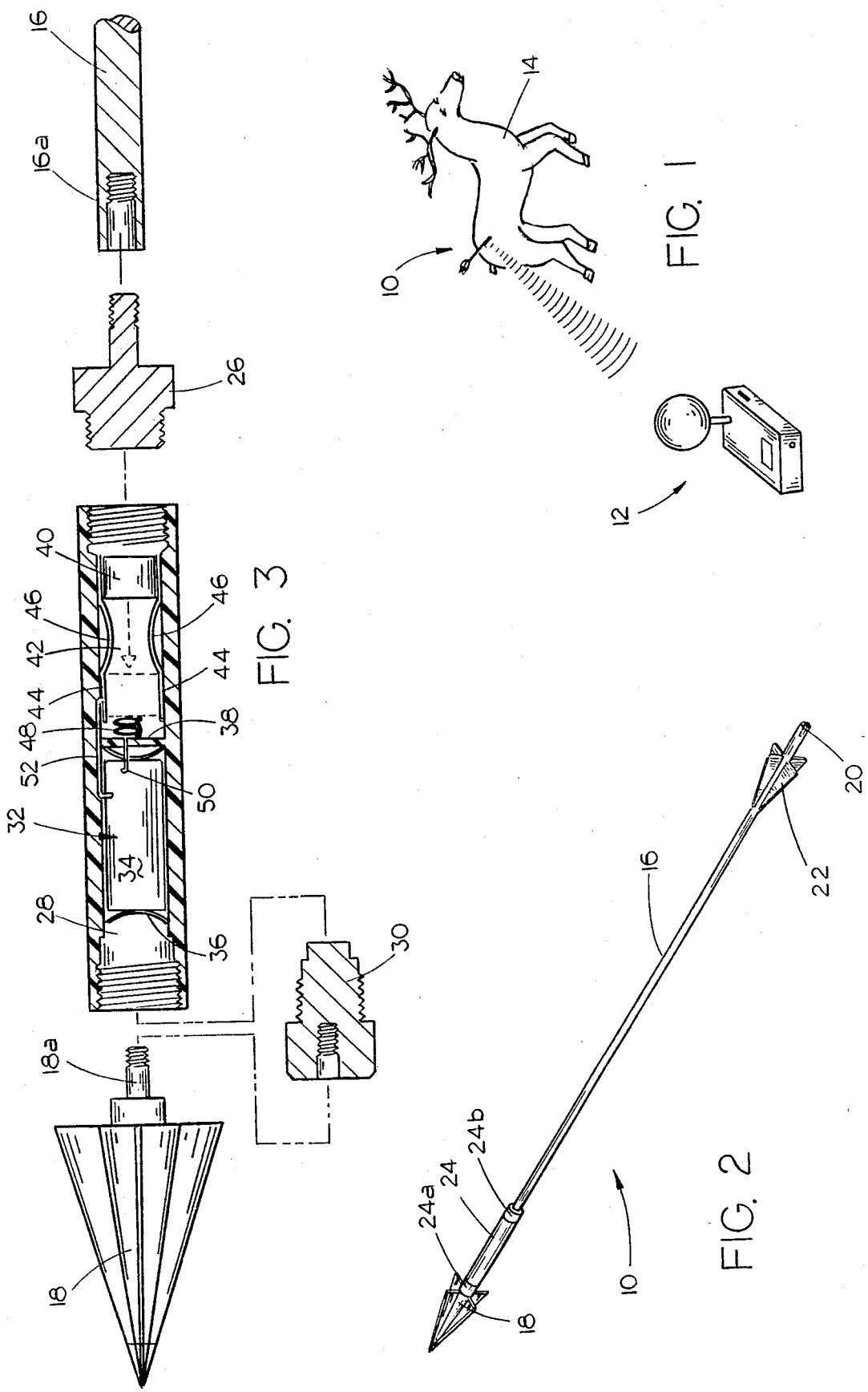

TRANSMITTER ATTACHMENT FOR HUNTING ARROWS

TECHNICAL FIELD

The present invention relates generally to hunting arrows, and more particularly to a transmitter which may be attached to hunting arrows for tracking purposes.

BACKGROUND OF THE INVENTION

Hunting game by means of a bow and arrow is a sport which requires considerable skill in bow handling. The bow hunter is required to move within very short distances of the game in order to be within an effective range.

Hunting arrows are relatively expensive items, and therefore a hunter makes every effort to retrieve each arrow which is shot during the course of hunting. It can be seen that an arrow may be easily lost, particularly if it misses the target and falls in dense brush or the like. If the hunter misses the target on the first shot, it must be decided whether to follow the game, or to look for the arrow, and hope for another shot later on. Because of the cost of the arrows, the decision is not always an easy one.

There are also occasions when the arrow is embedded in the game without an immediate kill and the animal flees the area. In areas of dense foliage, it is often difficult to track the wounded game, and on many occasions the wounded game may completely escape with the arrow. Thus, a means to reliably track the arrow has long been desired.

Various attempts have been made in the prior art to overcome such problems. One specific attempt to overcome such problems was through the provision of a hunting arrow with a radio transmitter locating means, as disclosed in U.S. Pat. No. 3,790,948 to Ratkovich. While the Ratkovich hunting arrow overcomes the general problem of locating a lost arrow, it suffers several technical deficiencies. One problem is in the use of a manual switch to activate and deactivate the transmitter. Ratkovich does not provide a reliable power switch which will disable the transmitter circuit. Thus, the transmitter may operate from the battery power for long periods of time before the hunter is able to disconnect the circuit. Such long periods of use affect the reliability of the batteries and the operation of the transmitter.

It is further noted that the Ratkovich arrow requires a special arrowhead to house the transmitter. Such an arrowhead is not an industry standard and thus could not be replaced with other standard arrowheads in the industry if the Ratkovich arrowhead were to be damaged. Ratkovich also requires a special arrow shaft for mounting on the arrowhead, which, therefore, suffers the same problems as the arrowhead.

In U.S. Pat. No. 4,421,319, to Murphy, an arrow is disclosed which includes a device on the nock of the arrow which produces an audible signal. Because the tail end of the arrow is frequently broken as the animal runs through the woods, the nock containing the device for producing the audible signal would not remain with the wounded animal if the arrow was broken. If the arrow was not broken, it is possible that the audible signal could frighten the wounded animal so that it runs abnormally long distances. Thus, the animal could run out of the range at which the hunter could hear the audible device, decreasing the chances of recovering the arrow and animal.

A special arrow is provided is U.S. Pat. No. 4,704,612 to Boy et al. which utilizes the metal parts of the arrowhead to form a primary antenna to emit a radio frequency signal. The device utilizes an electronic latch circuit which is triggered by an inertia switch to provide the transmitter with electrical power upon shooting the arrow. This system requires that the arrow be shot at a specific minimum velocity in order to trigger the transmitter, and further requires the use of a magnet to deactivate the transmitter upon recovery of the arrow. The use of an electronic latch circuit merely provides more electronic parts which increases the expense and the necessary maintenance and repair of the arrow. Because the system of the Boy patent utilizes the entire shaft and broadhead of the arrow, it is necessary to purchase the entire arrow with the transmitter and thereby render all other arrows in the hunter's arsenal obsolete.

Finally, U.S. Pat. No, 4,749,198 to Brailea discloses an arrow with a radio transmitter therein. The Brailean arrow suffers the same problem as Boy et al with respect to the expense of purchasing arrows. Brailean specifically calls for an antenna which is coextensive with the shaft, thereby requiring the hunter to purchase an entire arrow in order to utilize the benefits of the Brailean invention.

It is therefore a general object of the present invention to provide a transmitter attachment for a hunting arrow.

Another object of the present invention is to provide an arrow with a radio transmitter which is electronically activated once the arrow hits the target or the ground.

Yet another object of the present invention is to provide an arrow with a radio transmitter which is simple to operate and refined in appearance.

These and other objects of the present invention will be apparent to those skilled in the art.

SUMMARY OF THE INVENTION

The transmitter attachment for hunting arrows of the present invention includes a hollow tubular member which is removably mounted between the arrowhead and shaft of a conventional hunting arrow. The tubular member has a transmitter mounted in one end, and a battery slidably mounted between a pair of spring contacts in the other end. The battery is mounted so as to slide forward into electrical contact with a coil spring, which closes an electrical circuit to energize the transmitter, when the arrow hits the target or the ground. Thus, the combination of battery and contacts forms a type of inertia switch. A directional receiver is utilized to locate the arrow. The transmitter is deactivated by tapping the nock-end of the arrow against the ground—which slides the battery out of contact with the coil spring.

BRIEF DESCRIPTION OF THE DRAWINGS

FIG. 1 is a pictorial view depicting the application of the present invention in the sport of hunting;

FIG. 2 is a side elevational view of an arrow using the present invention, and

FIG. 3 is an enlarged cross-sectional view of one portion of the arrow of the present invention.

DESCRIPTION OF THE PREFERRED EMBODIMENT

Referring now to the drawings in which identical or corresponding parts are identified with the same reference numeral, and more particularly to FIG. 1, the arrow of the present invention is designated generally at 10 and will transmit a radio signal which can be received by a receiver 12 so as to locate the arrow. The arrow 10 may then be easily found whether it is imbedded in an animal 14 or merely lying on the ground after a missed shot.

Referring now to FIG. 2, arrow 10 includes a shaft 16 having an arrowhead 18 at its forward end and a nock 20 at its rearward end. A plurality of fletches 22 are symmetrically fastened about the shaft adjacent the rearward end 20, in a manner conventional in the art. A cylindrical transmitter attachment 24 is removably connected between shaft 16 and arrowhead 18, and includes a forward end 24a and a rearward end 24b.

Shaft 16 and arrowhead 18 are conventional elements known in the industry and are designed for interconnection utilizing an interiorly threaded end 16a on shaft 16, and an exteriorly-threaded end 18a on arrowhead 18, as shown in FIG. 3. Ends 24a and 24b of cylinder 24 are formed to interconnect in an identical fashion, and therefore may be easily inserted between shaft 16 and arrowhead 18.

Cylinder 24 is a hollow cylindrical member having a rearward removable end piece 26 which is threaded onto cylinder 24, to allow access to the interior cavity of cylinder 24. A forward end piece 30 has threads formed therein to receive arrowhead 18 as discussed hereinabove, and also to allow access to cavity 28.

A transmitter is designated generally at 32 and is constructed on a printed circuit board 34 which is mounted in the forward end of cavity 28 within cylinder 24. A spring 36 is mounted in the forward end of cavity 28 against end piece 30 so as to provide a biasing means which will absorb the shock of the circuit board 34 being urged forwardly upon contact of the arrow with the ground or the target. An electrically non-conductive plug 38 is mounted in cavity 28 rearwardly of the transmitter to separate transmitter 32 from a battery 40 and form a rearward battery cavity 42.

A pair of electrically conductive spring contacts are mounted diametrically within battery cavity 42 rearwardly of plug 38 with an arched portion 46 oriented inwardly in the cavity to provide frictional resistance to movement of battery 40 longitudinally within cavity 42.

An electrically conductive coil spring 48 is mounted within battery cavity 42 on plug 38 and will electrically engage battery 40 when the battery is moved forwardly within cavity 42, as shown in broken lines in FIG. 3. An electrical conductor electrically connects spring 48 to transmitter 32, and is channeled through an aperture in plug 38. A second electrical conductor 52 electrically connects spring contacts 44 with transmitter 32 as shown in the drawings.

In operation, transmitter attachment 24 may be connected between shaft 16 and arrowhead 18 of any conventional arrow, so as to allow any conventional arrow to be transformed into a radio transmitter arrow. Battery 40 will be located rearwardly in battery cavity 42 when the arrow is being carried and stored. Once the arrow has been launched, the momentum of the battery will cause the battery to slide between arched portions 46 of spring contacts 44 so as to electrically engage electrical coil spring 48 when the arrow either hits the target or the ground. The arched portions 46 of the spring contacts 44 will hold the battery in the engaged transmitting position until retrieved by the hunter. Receiver 12 may then be turned on to direct the hunter to the exact location of arrow 10. Once the hunter has retrieved the arrow, the transmitter may be disconnected from the battery by sharply tapping the nock end of the arrow so as to cause the battery to be forced rearwardly passed the arched portions 46 of the spring contacts 44.

Whereas the invention has been shown and described in connection with the preferred embodiment thereof, it will be understood that many modifications, substitutions and additions may be made which are within the intended broad scope of the appended claims. Thus, there has been shown and described an improved transmitter attachment for arrows which accomplishes at least all of the above stated objects.

I claim:

1. A transmitter attachment for a hunting arrow, the arrow of the type having a shaft and removable arrowhead, comprising:

a hollow tubular member having a first and second ends; said first ends having means for removable connection to an arrowhead;

said second end having means for removable connection to an arrow shaft;

transmitting means mounted within said tubular member for emitting a radio frequency signal;

a battery journaled within said tubular member for powering said transmitting means;

inertia-activation switch means operably mounted within said tubular member electrically connected between said battery and said transmitting means and operable between first and second positions, said first position electrically connecting said battery and transmitting means to operate the same, and said second position electrically disconnecting said battery and transmitting means;

said inertia-activation switch being operably mounted such that a dynamic force of predetermined magnitude directed longitudinally in a first direction along said hollow tubular member will move said switch to said first position, and a dynamic force of predetermined magnitude directed longitudinally in a second direction along said hollow tubular member will move said switch to said second position; and said inertia-activation switch being adapted to remain in either said first or said second positions in the absence of said dynamic forces.

2. The transmitter attachment of claim 1, wherein said inertia switch means includes:

a pair of spring contacts mounted within said tubular member and diametrically and radially opposed;

said spring contacts having first and second ends and an arched intermediate portion arched radially inwardly within said tubular member;

said battery being slidably mounted within said tubular member and between said contacts so as to slidably move between said first and second ends of said second contacts upon application of a longitudinal dynamic force of predetermined magnitude directed longitudinally along said tubular member, the battery having one of its terminals in constant electrical contact with said spring contacts;

a coil spring contact mounted within said tubular member adjacent the first ends of said spring contacts and located so as to be in electrical contact with one of the terminals on the battery when said battery is between the first ends of said spring contacts, and so as to be out of electrical contact when the battery is between the second ends on said spring contacts;

said spring contacts and said coil spring contact being electrically connected to said transmitting means.

3. The transmitter of claim 1, wherein said means for removable connection to an arrowhead includes a first end piece having a first threaded end formed to receive the threaded end of a conventional removable arrowhead, and a second threaded end selectively removably connected to said first end of said tubular member, such that said first end piece may be removed from said tubular member to permit access to the interior of said tubular member.

4. The transmitter attachment of claim 1 wherein said means for removable connection to an arrow shaft includes a second end piece having a first threaded end formed to receive the threaded end of a conventional removable arrow shaft, and a second threaded end selectively removably connected to said second end of said tubular member, such that said second end piece may be removed from said tubular member to permit access to the interior of said tubular member.

5. In combination:

a conventional arrow of the type having a shaft portion and an arrowhead portion, the shaft portion having a threaded forward end and the arrowhead portion having a threaded rearward end, the threaded ends of said shaft and arrowhead being adapted for selective securement together; and a transmitter attachment having a threaded forward end and a threaded rearward end adapted for selective attachment interposed between said shaft and arrowhead;

said transmitter attachment including:

a hollow tubular member having first and second ends;

a transmitting means mounted within said tubular member for emitting a radio frequency signal;

a battery journaled within said tubular member for powering said transmitting means; and inertia-activation switch means operably mounted within said tubular member, electrically connected between said battery and said transmitting means and operable between first and second positions, said first position electrically connecting said battery and transmitting means to operate the same, and said second position electrically disconnecting said battery and transmitting means;

said inertia-activation switch being operably mounted such that a rearwardly-directed dynamic force of predetermined magnitude on said arrow will move said switch to said first position, and a forwardly-directed dynamic force of predetermined magnitude on said arrow will move said switch to said second position; and said inertia-activation switch being adapted to remain in either said first or second positions in the absence of said dynamic forces.

* * * * *